United States Patent [19]
Janssen et al.

[11] 3,979,958
[45] Sept. 14, 1976

[54] APPARATUS FOR DETERMINING INTERFACE LEVELS IN GROUND CAVITIES OR CONTAINERS CONTAINING LIQUID OR GEL-LIKE MATERIAL

[75] Inventors: Wladimir Janssen, Carignan; Harley Corey Prime, St. Lambert, both of Canada

[73] Assignee: Canadian Industries, Ltd., Montreal, Canada

[22] Filed: Jan. 13, 1976

[21] Appl. No.: 648,787

[30] Foreign Application Priority Data
Jan. 31, 1975 Canada .............................. 219129

[52] U.S. Cl. ............................................. 73/290 R
[51] Int. Cl.² ......................................... G01F 23/16
[58] Field of Search ............ 73/37, 37.5, 240, 37.6, 73/37.9

[56] References Cited
UNITED STATES PATENTS
3,213,670   10/1965   MacGeorge ..................... 73/290 R

*Primary Examiner*—S. Clement Swisher
*Attorney, Agent, or Firm*—Donald G. Ballantyne

[57] ABSTRACT

An apparatus is provided for determining the location of a liquid-liquid or a liquid-gas interface in tanks or cavities and has particular use in determining the position of the explosive collar level in boreholes charged with water gel explosives. The apparatus consists of a sensing element which may be lowered into a cavity. Air is exhausted from the sensing element into the surrounding medium. Any restriction to air flow caused by the surrounding medium causes an increase in air pressure which increase signals the presence of an interface.

8 Claims, 1 Drawing Figure

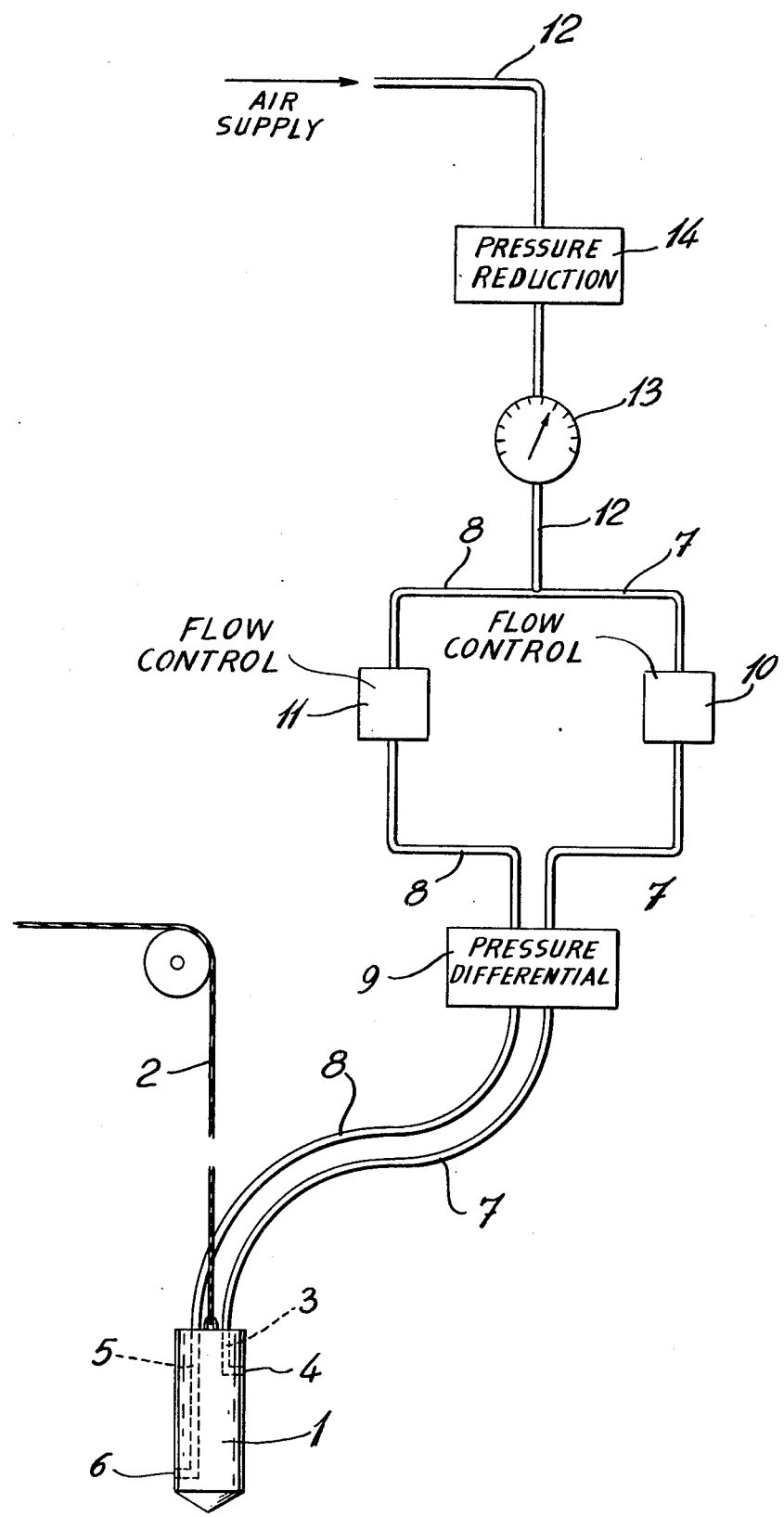

APPARATUS FOR DETERMINING INTERFACE LEVELS IN GROUND CAVITIES OR CONTAINERS CONTAINING LIQUID OR GEL-LIKE MATERIAL

This invention relates to an apparatus for determining the location or level of a liquid-gas or a liquid-liquid interface in a cavity. The cavity-containing liquid can, for example, be a pourable or pumpable water gel explosive loaded in a vertical borehole.

Where water is initially present in a vertical borehole loaded with water gel explosive an explosive-water interface will form since water gel explosive is of higher density than water and will fall to the bottom of the borehole. When no water is initially present in the borehole, an explosive-air interface will exist.

In blasting operations employing pumpable or pourable water gel explosives in vertical boreholes, it is generally required to load explosives in the borehole only to a critical height or level in order to optimize blasting efficiency and explosives costs. In common practice, knowing the depth and diameter of a borehole, the blasting operator who wishes to place only a given weight or volume of explosives in the hole, will determine the level to which the desired quantity will reach. He will then pump or pour the water gel explosive into the hole up to this level. The unfilled portion of the borehole above the explosive is known as the collar of the bore hole and the upper level of the column of explosive is called the collar level. Frequently the collar level is difficult to determine with accuracy, particularly if it is well below grade and hence beyond easy vision. In water-containing boreholes, the explosive-water interface is particularly difficult to determine. Generally the blaster relies on the "feel" of the explosive loading hose or a wooden rod or probe to estimate when filling has reached the desired collar level. Alternatively, he may rely on a knowledge of the pumping capacity of the explosive filling pump to estimate when the collar level is reached. However, pumping capacity is subject to variations related to explosive densities and temperatures and, as well, some explosive may be lost in rock fissures adjacent the borehole.

The literature has offered some suggestions related to the determination of the level of fluid material in vertical boreholes. U.S. Pat. No. 3,361,023 (Collins et al.) proposed that a temperature sensitive element attached to the end of a water gel explosive filling hose might be employed to regulate the rate of withdrawal of the hose from a borehole. Such a device is not, however, adapted to indicate any particular level of filling or collar height but rather is devised as a means for keeping the end of the hose well below the level of the explosive during the filling operation. Temperature sensing devices would be of limited accuracy because the explosive adheres to the sensing element and effects the response to temperature changes. Furthermore, the water at the interface position tends to quickly reach the temperature of the water gel explosive. In general, any electrical probe or temperature sensing element in an explosive-filled borehole may be undesirable because of the danger of inadvertent detonation caused by electrical malfunction.

Roussin et al. in U.S. Pat. No. 3,616,688 suggest the use of a gradiomanometer type of apparatus for measuring the density of fluids in a borehole to determine their location. The apparatus comprises two sets of bellows which may be moved through fluids in the borehole, which bellows will be compressed by the fluids. A measure of the relative movement of the bellows, being a function of the density of the fluids, can be used to locate the position of a fluid interface in the borehole. Such an apparatus is not adapted nor suitable for use with viscous water gel explosives.

According to the present invention, an apparatus is provided which may be employed safely and conveniently to provide an accurate determination of the height to which a water gel explosive has risen in a borehole during filling.

The apparatus of the invention comprises, in combination, an elongated body adapted for lowering into a cavity, container or borehole, at least two enclosed channels within said elongated body, said channels terminating in outlets spaced vertically apart in a side wall in said elongated body, conduit means for conveying separate streams of a gas through said enclosed channels and to said spaced-apart outlets, means responsive to any change in pressure in the said separate gaseous fluid streams, and means associated with said pressure responsive means whereby an electric circuit may be operated.

The invention may be more easily understood by reference to the accompanying drawing which shows in a diagrammatic vertical view the various essential components of the apparatus.

Referring to the drawing, there is shown an elongated body 1 preferably of metal such as steel, adapted to be lowered, for example, by means of a cable 2, into a borehole (not shown). Body 1 will be of a density greater than that of water or water gel explosives. Within body 1 is channel 3 terminating in outlet 4 and channel 5 terminating in outlet 6. Outlets 4 and 6 are spaced vertically apart, for example, about 6 inches. Connected to channels 3 and 5 are, respectively, gaseous fluid conduits 7 and 8. Conduits 7 and 8 are preferably durable, flexible rubber hoses such as are used in gas welding equipment and may be used as a means for lowering body 1 into a borehole. Conduits 7 and 8 are connected to pressure differential switch 9. Switch 9, which is of the type, for example, supplied by Dwyer Instruments, Inc., Michigan City, Ind., U.S.A., is responsive to any change in the pressure differential of the gaseous fluids in conduits 7 and 8. Beyond switch 9, conduits 7 and 8 are connected through flow control valves 10 and 11 respectively whereby the flow of gaseous fluid through conduits 7 and 8 may be equalized. Beyond valves 10 and 11, conduits 7 and 8 are merged into a common conduit 12, which conduit is connected to pressure indicator gauge 13 and pressure reducing valve 14. High pressure air from a source (not shown) enters conduit 12 in the direction indicated by the arrow. The components of the apparatus including pressure differential switch 9, flow control valves 10 and 11, gauge 13, and reducing valve 14 will conveniently be housed in a container or box, which box may be placed close to the operator for easy access and view. If desired, additional hosing conduits and valves (not shown) may be incorporated into the apparatus to permit purging or "blowing out" of hoses 7 and 8 and channels 3 and 5 with high pressure air.

In typical use in the field, high pressure air at about 100 psig from an air compressor normally found at the drilling and blasting site or mounted upon the explosive mix/pump truck, is led into conduit 12 and reduced in pressure to about 10 psig by pressure reducing valve 14. The air of reduced pressure passes into conduits 7 and 8, through flow control valves 10 and 11 and into pressure differential switch 9. Flow control valves 10 and 11 maintain a constant flow of air through conduits 7 and 8. For ease of operation, flowrates through conduits 7 and 8 are set equal and small resulting in a bubbling flow of air when body 1 is held in water. Switch 9, which is preset to close at a predetermined pressure difference in conduits 7 and 8, is adapted to activate a mechanism which closes an electric circuit when the pressure difference between conduits 7 and 8 exceeds the preset value. Air continues through conduits 7 and 8 and enters channels 3 and 5 in body 1 where it is exhausted at outlets 4 and 6. The operator lowers body 1 and its attached conduits 7 and 8 through air or water in a borehole to a predetermined position or collar level. For this purpose, cable 2 or conduits 7 and 8 may have graduated distance markings thereon. Body 1 is retained at the desired collar height and the borehole is then filled from the bottom upwards with water-gel explosives from an explosives loading hose. As the level of the fluid explosives rises in the borehole lifting any borehole water above it, the level of the dense water gel explosive will reach outlets 6 and 4 in body 1 and thereby increase the pressure of air in conduits 7 and 8 resulting in an increased pressure difference which will be sensed at pressure differential switch 9. Switch 9 responds to the change in pressure difference by operating a mechanism which closes an electric circuit. The electric circuit may be utilized to, for example, shut down the explosive pumping apparatus or operate a visual or audible warning device or the like, which device will alert the operator that the desired collar height of explosives has been reached.

The vertical distance separating outlets 4 and 6 in body 1 may, for example, be 6 inches. When the apparatus is used in a water-filled borehole, pressure differential switch 9 is preset to a standard condition reflecting the pressure difference in conduits 7 and 8 of a 6 inch water column, which standard condition will maintain regardless of the head of water above outlets 4 and 6. Any pressure difference beyond that of a 6 inch water-column caused by the rise of the denser water gel explosive covering outlets 4 and 6 causes switch 9 to function to provide warning signal or do other work.

The invention is illustrated with references to the following Example.

EXAMPLE

In an operation at a guarry site, it was desired to fill a borehole 10 inches in diameter and 60 feet deep with a water gel explosives having a density of 1.5 to a collar level of 20 feet. The borehole contained water to a height of about 15 feet from its bottom. A sensing apparatus as described heretofore and shown in the drawing was employed having a vertical distance of 6 inches between outlets 4 and 6 in body 1, and a pressure differential switch preset to close at a 7 inch water column. Body 1 was lowered to the collar level of 15 feet and the borehole filled from the bottom with water gel explosive by means of a 2 inch diameter loading hose. The electric circuit through switch 9 was connected in series to the electrically controlled explosives pump delivering explosives to the borehole. When the level of the explosive in the borehole reached the collar level and covered outlets 4 and 6 in body 1, pressure differential switch 9 operated to shut down the explosive delivery pump. The collar height in the borehole was subsequently checked by means of a sensitive feeler probe and was found to be within 2 inches of the desired collar position.

The response time of the apparatus, that is the time lapse between the moment when the water gel explosive reaches body 1 and the closing of the pressure differential switch 9, is typically of the order of one to two seconds. Depending on the pumping rate, certain deviations may result from the level which is desired. These deviations can be corrected by locating body 1 slightly lower in the borehole.

The apparatus of the invention will be seen to provide a convenient and safe means for determining borehole loading levels when using fluid, water gel explosives. The apparatus is light weight and easily transportable between holes and may be adjusted simply by the blasting operator for various borehole conditions.

While the apparatus and method of its use has been described particularly for use in determining collar levels in explosive-filled boreholes, it may also find application, for example, in locating oil-water interfaces in deep oil wells or in locating liquid levels in both above-ground and below-ground deep storage tanks and the like.

What we claim is:

1. An apparatus for determining an interface level in cavities or containers containing liquid material comprising:
   a. an elongated sensing element having a side wall annd being adapted for lowering into a liquid-containing cavity, said sensing element having two gas-conducting channels therethrough, said channels terminating in vertically spaced-apart exhaust ports in the said side wall;
   b. separate gas conduit means adapted to deliver pressurized gas at a constant flow rate into each of said channels and through said exhaust ports;
   c. pressure monitoring means associated with said gas conduits whereby any change or variation in gas pressure in or between said conduits caused by a restriction of gas flow from said exhaust ports may be sensed; and
   d. means associated with said pressure monitoring means whereby a signal may be generated when a change or variation in gas pressure in or between said conduits occurs.

2. An apparatus as claimed in claim 1 also comprising gas pressure reducing means to provide gas at low pressure for passage into said conduits and channels.

3. An apparatus as claimed in claim 1 also comprising a gas pressure indicator.

4. An apparatus as claimed in claim 1 wherein the said sensing element is adapted for lowering into a liquid-containing cavity by a mechanical lowering device.

5. An apparatus as claimed in claim 1 wherein the said separate gas conduit means comprise flexible rubber hoses.

6. An apparatus as claimed in claim 1 wherein said sensing element is made of metal having a density greater than that of water.

7. An apparatus as claimed in claim 1 wherein the said pressure monitoring means is a pressure differential switch adapted to control an electric circuit.

8. A method for determining the location of a liquid/liquid interface or a liquid/gas interface in a liquid-containing cavity comprising the steps of passing separate streams of gas at constant pressure by means of conduits through vertically spaced-apart outlets in the side wall of an elongated body, lowering the said elongated body into a cavity to contact any liquid therein, the said liquid restricting the flow of gas from said outlets, monitoring the gas pressure in said conduits to register any change in gas pressure between the conduits as the elongated body contacts the cavity liquid and observing the depth at which the elongated body is positioned when such pressure difference is observed.

* * * * *